(12) United States Patent
Gritti et al.

(10) Patent No.: US 9,332,169 B2
(45) Date of Patent: May 3, 2016

(54) ESTIMATING CONTROL FEATURE FROM REMOTE CONTROL WITH CAMERA

(75) Inventors: Tommaso Gritti, Eindhoven (NL); Petrus Augustinus Maria Van Grinsven, Hooge Mierde (NL)

(73) Assignee: Koninklijke Philips N.V., Eindhoven (NL)

( * ) Notice: Subject to any disclaimer, the term of this patent is extended or adjusted under 35 U.S.C. 154(b) by 112 days.

(21) Appl. No.: 13/983,638

(22) PCT Filed: Feb. 17, 2012

(86) PCT No.: PCT/IB2012/050728
§ 371 (c)(1),
(2), (4) Date: Aug. 5, 2013

(87) PCT Pub. No.: WO2012/114240
PCT Pub. Date: Aug. 30, 2012

(65) Prior Publication Data
US 2013/0314560 A1 Nov. 28, 2013

(30) Foreign Application Priority Data
Feb. 21, 2011 (EP) .................................. 11155161

(51) Int. Cl.
*H04N 5/232* (2006.01)
*G08C 17/00* (2006.01)

(52) U.S. Cl.
CPC ............ *H04N 5/23203* (2013.01); *G08C 17/00* (2013.01); *G08C 2201/32* (2013.01)

(58) Field of Classification Search
CPC .............. H04N 5/232; H04N 5/23203; H04N 5/23206; G08C 17/00; G08C 2201/32; G06F 3/0304
See application file for complete search history.

(56) References Cited

U.S. PATENT DOCUMENTS

| 5,488,675 | A | 1/1996 | Hanna |
| 5,504,501 | A * | 4/1996 | Hauck et al. .................. 345/158 |
| 7,542,072 | B2 * | 6/2009 | DeMenthon ............. 348/207.99 |
| 7,566,858 | B2 * | 7/2009 | Hotelling et al. .......... 250/208.2 |
| 2005/0275630 | A1 * | 12/2005 | Butterworth et al. ......... 345/166 |
| 2006/0023111 | A1 | 2/2006 | DeMenthon |

(Continued)

FOREIGN PATENT DOCUMENTS

| EP | 0943211 A1 | 9/1999 |
| JP | 07322367 A | 12/1995 |

(Continued)

*Primary Examiner* — Luong T Nguyen

(57) ABSTRACT

An apparatus (1) estimates control features of remote controls (10) comprising cameras (11) for detecting light points (51, 52) from beacons (31, 32) located at or near devices (20) that are to be controlled via the remote controls (10) by letting the cameras (11) further detect light points (61, 62) from non-beacons (41, 42). Processors (2) estimate the control features in response to information from the detections of the light points (51, 52, 61, 62). The non-beacons (41, 42) comprise noise sources or any other sources different from the beacons (31, 32). Memories (3) store per time-interval the information per detection. The light coming from the beacons (31, 32) may be modulated light and the light coming from the non-beacons (41, 42) may be other light. The information may comprise coordinates, sizes and intensities of light points (51, 52, 61, 62) per detection and per time-interval. The control feature may comprise a pointing position, a distance, a rotation, a tilt, a location, a speed, an acceleration, a movement and/or a zoom of the remote control (10).

14 Claims, 3 Drawing Sheets

(56) References Cited

U.S. PATENT DOCUMENTS

| | | |
|---|---|---|
| 2008/0121782 A1 | 5/2008 | Hotelling et al. |
| 2008/0180396 A1 | 7/2008 | Lin et al. |
| 2009/0009469 A1 | 1/2009 | Hsu et al. |
| 2009/0051651 A1 | 2/2009 | Han et al. |

FOREIGN PATENT DOCUMENTS

| | | |
|---|---|---|
| JP | 2003208260 A | 7/2003 |
| JP | 2009522681 A | 6/2009 |
| WO | 9824242 A1 | 6/1998 |

* cited by examiner

ESTIMATING CONTROL FEATURE FROM REMOTE CONTROL WITH CAMERA

CROSS-REFERENCE TO PRIOR APPLICATIONS

This application is the U.S. National Phase application under 35 U.S.C. §371 of International Application No. PCT/PCT/IB2012/050728, filed Feb. 17, 2012, which claims the benefit of European Patent Application No. 11155161.0, filed Feb. 21, 2011. These applications are hereby incorporated by reference herein.

FIELD OF THE INVENTION

The invention relates to an apparatus for estimating at least one control feature of a remote control, the remote control comprising a camera for detecting at least one light point originating from at least one beacon located at or near a device that is to be controlled via the remote control.

The invention further relates to a remote control comprising the apparatus, to a device comprising the apparatus, to a method for estimating at least one control feature of a remote control, the remote control comprising a camera for detecting at least one light point originating from at least one beacon located at or near a device that is to be controlled via the remote control, to a computer program product for performing the step of the method, and to a medium for storing and comprising the computer program product.

Examples of such a device are devices with displays and other devices that are to be controlled remotely.

BACKGROUND OF THE INVENTION

An apparatus for estimating at least one control feature of a remote control, the remote control comprising a camera for detecting at least one light point originating from at least one beacon located at or near a device that is to be controlled via the remote control, is known from Philips® uWand® technology.

A problem might come up, when a further light point is detected as well, that does not originate from a beacon, but for example originates from a noise source. Existing technology tries to filter and/or eliminate such further light points, which is not always easy.

SUMMARY OF THE INVENTION

It is an object of the invention to provide an improved apparatus for estimating at least one control feature of a remote control, the remote control comprising a camera for detecting at least one light point originating from at least one beacon located at or near a device that is to be controlled via the remote control.

Further objects of the invention are to provide a remote control comprising the apparatus, a device comprising the apparatus, a method for estimating at least one control feature of a remote control, the remote control comprising a camera for detecting at least one light point originating from at least one beacon located at or near a device that is to be controlled via the remote control, a computer program product for performing the step of the method, and a medium for storing and comprising the computer program product.

According to a first aspect, an apparatus is provided for estimating at least one control feature of a remote control, the remote control comprising a camera for detecting at least one light point originating from at least one beacon located at or near a device that is to be controlled via the remote control and for detecting at least one light point originating from at least one non-beacon, the light coming from the at least one beacon being different from the light coming from the at least one non-beacon, the apparatus comprising
  a processor for estimating the at least one control feature in response to information from detections of the light points.

To estimate the at least one control feature, the processor not only uses information from a detection of a light point from a beacon but also uses information from a detection of a light point from a non-beacon. In other words, the light point originating from a noise source, which light point in the past had to be filtered and/or eliminated, is now used for creating additional information. A presence of additional information can be used for compensating for missing information and for creating more information to improve an estimation of control feature.

The non-beacon comprises a noise source or any other source different from a beacon.

An embodiment of the apparatus is defined by the at least one light point originating from the at least one beacon comprising first and/or second light points originating from first and/or second beacons, and the at least one light point originating from the at least one non-beacon comprising third and/or fourth light points originating from first and/or second non-beacons, the camera being arranged for detecting the first and/or second light points per time-interval and the third and/or fourth light points per time-interval, the information comprising first and/or second information from first and/or second detections of the first and/or second light points per time-interval and third and/or fourth information from third and/or fourth detections of the third and/or fourth light points per time-interval, and the apparatus further comprising
  a memory for storing per time-interval the first and/or second information and the third and/or fourth information.

By detecting light points per time-interval and by storing information per time-interval, light points can be tracked and more information is collected. A further light point from a third beacon or further light points from third and fourth beacons etc. are not to be excluded. And a yet further light point from a third non-beacon or yet further light points from third and fourth non-beacons etc. are not to be excluded.

An embodiment of the apparatus is defined by, whereby of the first and/or second beacons only the first beacon is present and whereby of the first and/or second non-beacons only the first non-beacon is present, the processor being arranged for, in case the first light point cannot be detected in a time-interval, estimating the first information for this time-interval by processing the third information from this time-interval and the first and third information from a previous time-interval. This embodiment defines an estimation in case one beacon and one non-beacon are present.

An embodiment of the apparatus is defined by, whereby of the first and/or second beacons the first beacon and the second beacon are present and whereby of the first and/or second non-beacons only the first non-beacon is present, the processor being arranged for, in case the first light point cannot be detected in a time-interval, estimating the first information for this time-interval by processing the second and third information from this time-interval and the first and second and third information from a previous time-interval. This embodiment defines an estimation in case two beacons and one non-beacon are present.

An embodiment of the apparatus is defined by, whereby of the first and/or second beacons the first beacon and the second beacon are present and whereby of the first and/or second non-beacons the first non-beacon and the second non-beacon are present, the processor being arranged for, in case the first light point cannot be detected in a time-interval, estimating the first information for this time-interval by processing the second and third and fourth information from this time-interval and the first and second and third and fourth information from a previous time-interval. This embodiment defines an estimation in case one beacon and two non-beacons are present.

An embodiment of the apparatus is defined by, whereby of the first and/or second beacons the first beacon and the second beacon are present and whereby of the first and/or second non-beacons the first non-beacon and the second non-beacon are present, the processor being arranged for improving an estimation of the at least one control feature in response to the first and second and third and fourth information from this time-interval and/or the first and second and third and fourth information from a previous time-interval. This embodiment defines an improve of an estimation in case two beacons and two non-beacons are present.

An embodiment of the apparatus is defined by the light coming from the at least one beacon being modulated light and the light coming from the at least one non-beacon being other light.

An embodiment of the apparatus is defined by the information comprising a coordinate and/or a size and/or an intensity per detection and per time-interval.

An embodiment of the apparatus is defined by the at least one control feature comprising a pointing position on the device and/or a distance between the remote control and the device and/or a rotation of the remote control and/or a tilt of the remote control and/or a location of the remote control with respect to the device.

An embodiment of the apparatus is defined by the at least one control feature comprising a speed of the remote control and/or an acceleration of the remote control and/or a movement of the remote control and/or a zoom of the remote control.

According to a second aspect, a remote control is provided comprising the apparatus as defined above.

According to a third aspect, a device is provided comprising the apparatus as defined above.

According to a fourth aspect, a method is provided for estimating at least one control feature of a remote control, the remote control comprising a camera for detecting at least one light point originating from at least one beacon located at or near a device that is to be controlled via the remote control and for detecting at least one light point originating from at least one non-beacon, the light coming from the at least one beacon being different from the light coming from the at least one non-beacon, the method comprising
    a step of estimating the at least one control feature in response to information from detections of the light points.

According to a fifth aspect, a computer program product is provided for performing the step of the method as defined above.

According to a sixth aspect, a medium is provided for storing and comprising the computer program product as defined above.

An insight could be that a detection of a further light point that originates from a non-beacon could be used to create additional information.

A basic idea could be that a control feature is to be estimated in response to information from detections of light points from a beacon as well as a non-beacon.

A problem to provide an improved apparatus for estimating at least one control feature of a remote control has been solved.

A further advantage could be that a processing capacity for filtering and/or eliminating a light point originating from a non-beacon can be reduced and/or avoided.

These and other aspects of the invention will be apparent from and elucidated with reference to the embodiments described hereinafter.

DETAILED DESCRIPTION OF EMBODIMENTS

Figure 1:
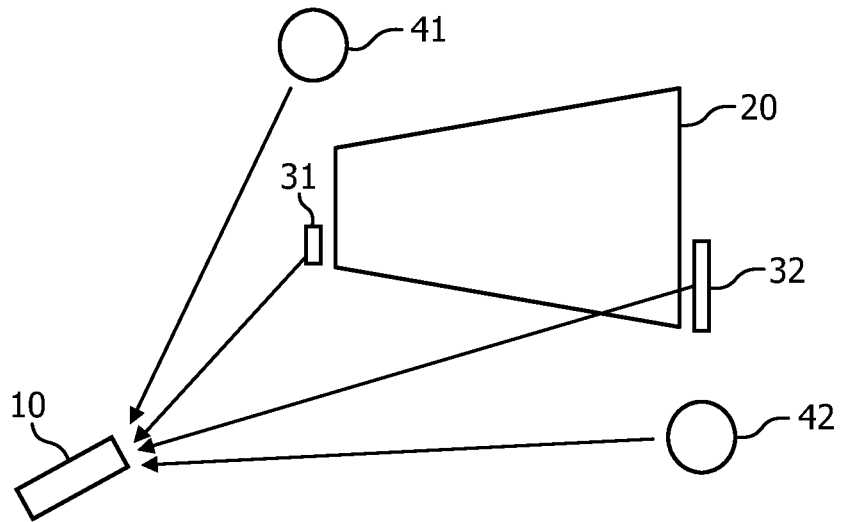
FIG. 1 shows a remote control and a device in use and shows beacons near the device and non-beacons.

In the FIG. 1, a remote control 10 and a device 20 are shown in use. Near the device 20, beacons 31 and 32 are shown. Alternatively, these beacons 31 and 32 may form part of the device 20. Further, non-beacons 41 and 42 are shown. The light coming from the beacons 31 and 32 is for example infrared light and/or is for example light modulated in frequency, wavelength, intensity, on/off mode etc. The light coming from the non-beacons 41 and 42 is other light, for example other infrared light and/or otherwise modulated light or not modulated light. The non-beacons 41 and 42 are for example noise sources such as lamps, reflections, sunlight etc.

Figure 2:
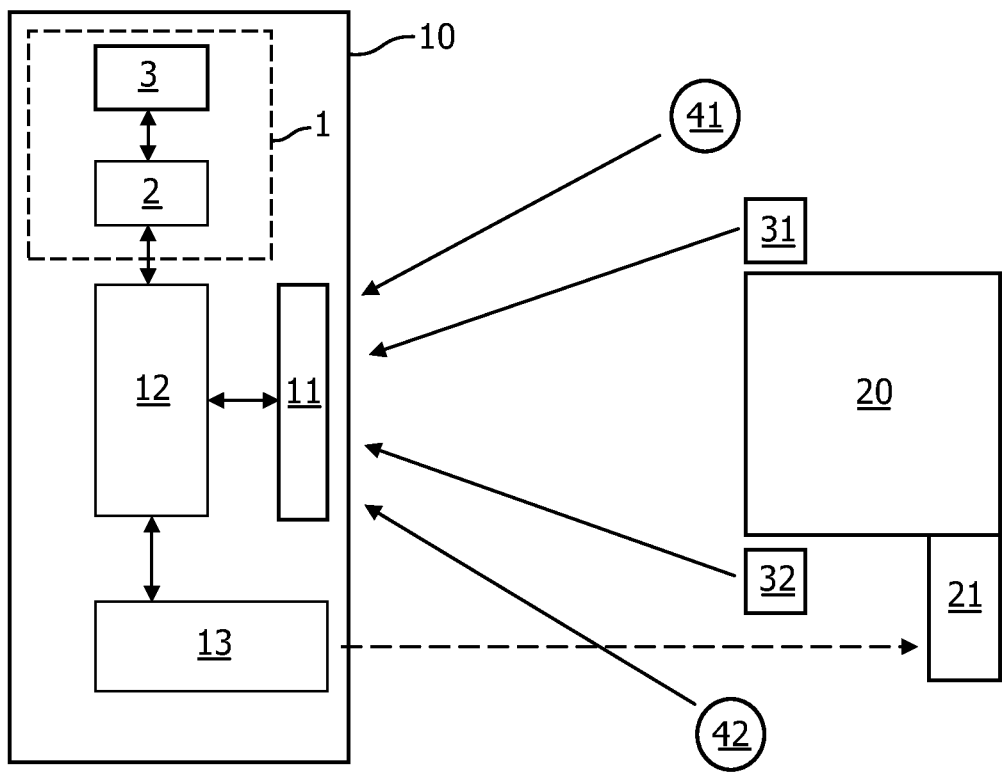
FIG. 2 shows a remote control and a device schematically, the remote control comprising an apparatus and a camera.

In the FIG. 2, a remote control 10 and a device 20 are shown schematically. The remote control 10 comprises an apparatus 1 and a camera 11. The camera 11 is coupled to a controller 12. One side of the controller 12 is coupled to a transmitter 13 and an other side of the controller 12 is coupled to a processor 2 of the apparatus 1. The processor 2 is coupled to a memory 3 of the apparatus 1. The transmitter 13 sends control data to a receiver 21 coupled to the device 20 for controlling the device 20. The camera 11 detects light points on a map per time-interval, the light points originating from the beacons 31 and 32 and from the non-beacons 41 and 42, as shown in the FIG. 3-5. The control data is usually exchanged wirelessly, for example via a radio frequency signal or another wireless signal.

Alternatively, the apparatus 1 may form part of the controller 12, or vice versa. Alternatively, the apparatus 1 may take the place of the controller 12, or the apparatus 1 may be located between the controller 12 and the transmitter 13. The receiver 21 may alternatively form part of the device 20 etc.

Figure 3:
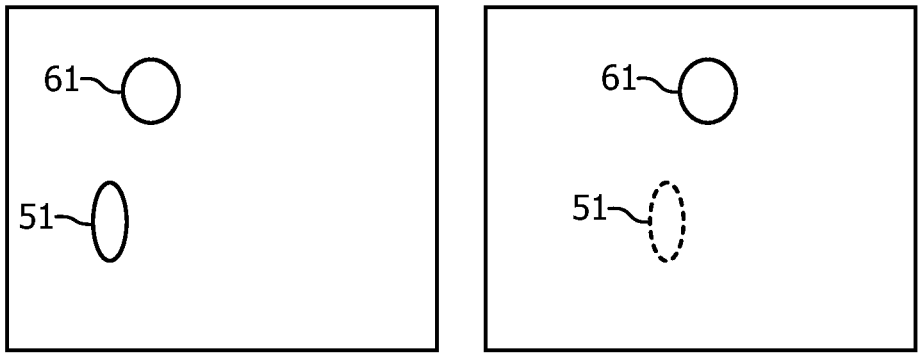
FIG. 3 shows first maps created by the camera of the remote control for two different time-intervals.
Figure 4:
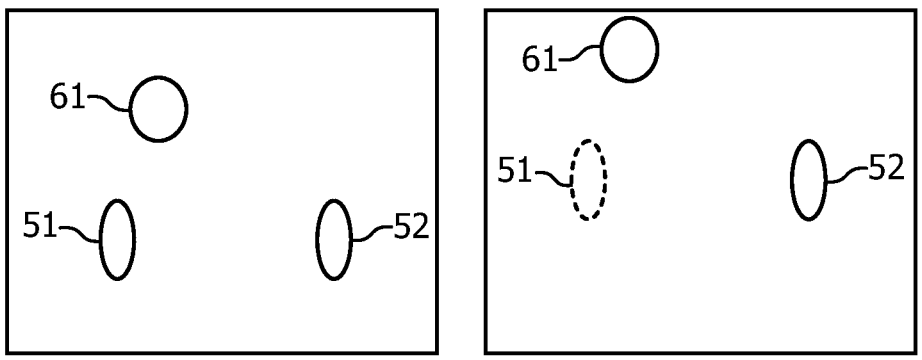
FIG. 4 shows second maps created by the camera of the remote control for two different time-intervals.
Figure 5:
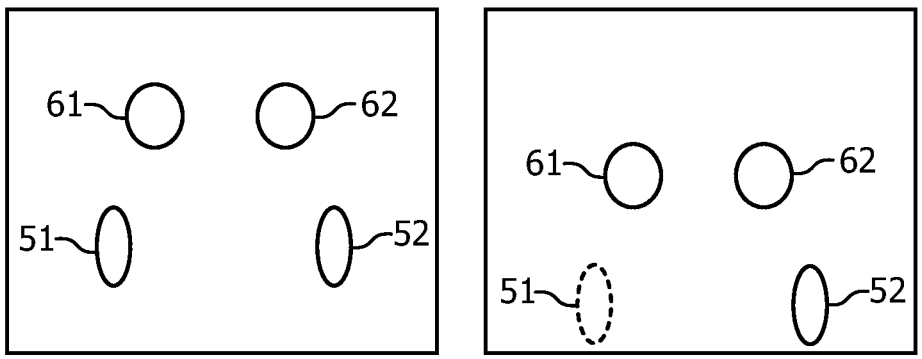
FIG. 5 shows third maps created by the camera of the remote control for two different time-intervals.

Also in view of the FIG. 3-5, the camera 11 detects first and/or second light points 51 and/or 52 originating from the beacons 31 and/or 32 and detects third and/or fourth light points 61 and/or 62 originating from the non-beacons 41 and/or 42. The processor 2 estimates at least one control feature in response to information from detections of the light points 51, 52, 61 and/or 62. This control feature is to be sent to the device 20 as the control data or is to be converted into the control data for controlling the device 20.

The camera 11 is preferably arranged for detecting the first and/or second light points 51 and 52 per time-interval and the third and/or fourth light points 61 and 62 per time-interval. The information comprises first and/or second information from first and/or second detections of the first and/or second light points 51 and 52 per time-interval and third and/or fourth information from third and/or fourth detections of the third and/or fourth light points 61 and 62 per time-interval. The memory 3 stores per time-interval the first and/or second information and the third and/or fourth information.

The information comprises for example a coordinate and/or a size and/or an intensity (of a light point 51, 52, 61 and/or 62) per detection and per time-interval. The at least one control feature may comprise a pointing position on the device 20 and/or a distance between the remote control 10 and the device 20 and/or a rotation of the remote control 10 and/or a tilt of the remote control 10 and/or a location of the remote control 10 with respect to the device 20. The at least one control feature may comprise a speed of the remote control 10 and/or an acceleration of the remote control 10 and/or a movement of the remote control 10 and/or a zoom of the remote control 10. The zoom or a change thereof may further be used for instructing the device 20. The remote control 10 may add further data to the control data for instructing the device 20, for example in response to a user having pressed a button, or for example coming from an acceleration sensor or a tilt sensor etc.

To be able to distinguish the light coming from a beacon 31-32 on the one hand and a non-beacon 41-42 on the other hand, the camera 11 may for example be arranged to detect the frequency or the wavelength or the intensity or the on/off mode etc. of the modulated light from the beacon 31-32 and/or the camera 11 may for example be arranged to detect a feature of the otherwise modulated light or the non-modulated light from the non-beacon 41-42. Detections of the frequency and the wavelength and the intensity and the on/off mode etc. are common in the art. In addition, for a detection of the on/off mode, a duration of a time-interval may need to be chosen longer than a period of the on/off mode, and/or a period of the on/off mode may need to be chosen shorter than a duration of a time-interval, and/or further time (if present) between two subsequent time-intervals may need to be chosen properly compared to a period of the on/off mode, and/or a period of the on/off mode may need to be chosen properly compared to further time (if present) between two subsequent time-intervals, and/or several time-intervals may need to be used etc. Said detections may alternatively be shifted partly or entirely from the camera 11 into the controller 12 and/or the apparatus 1.

In the FIG. 3, first maps are shown created by the camera 11 of the remote control 10 for two different time-intervals. In this case the beacon 32 and the non-beacon 42 are for example not present or covered all the time. At a first time-interval or a first moment in time, the camera 11 creates a map comprising the light point 51 from the beacon 31 and the light point 61 from the beacon 41. At a second time-interval or a second moment in time, the camera 11 creates a map comprising the light point 61 from the beacon 41 only owing to the fact that the light point 51 from the beacon 31 is temporarily non-detectable as indicated by the dashed line. However, by using the information from both maps, a new position of the light point 51 can be calculated, here for example under an assumption that no rotation has taken place. Clearly, a user, compared to the first time-interval, is pointing a bit more to the left in the second time-interval owing to the fact that the light points 51 and 61 are located a bit more to the right.

In the FIG. 4, second maps are shown created by the camera 11 of the remote control 10 for two different time-intervals. In this case the non-beacon 42 is for example not present or covered all the time. At a first time-interval or a first moment in time, the camera 11 creates a map comprising the light point 51 from the beacon 31 and the light point 52 from the beacon 32 and the light point 61 from the beacon 41. At a second time-interval or a second moment in time, the camera 11 creates a map comprising the light point 52 from the beacon 32 and the light point 61 from the beacon 41 only owing to the fact that the light point 51 from the beacon 31 is temporarily non-detectable as indicated by the dashed line. However, by using the information from both maps, a new position of the light point 51 can be calculated. Clearly, a user, compared to the first time-interval, is pointing a bit lower in the second time-interval owing to the fact that the light points 51 and 52 and 61 are located a bit higher.

In the FIG. 5, third maps are shown created by the camera 11 of the remote control 10 for two different time-intervals. At a first time-interval or a first moment in time, the camera 11 creates a map comprising the light point 51 from the beacon 31 and the light point 52 from the beacon 32 and the light point 61 from the beacon 41 and the light point 62 from the beacon 42. At a second time-interval or a second moment in time, the camera 11 creates a map comprising the light point 52 from the beacon 32 and the light point 61 from the beacon 41 and the light point 62 from the beacon 42 only owing to the fact that the light point 51 from the beacon 31 is temporarily non-detectable as indicated by the dashed line. However, by using the information from both maps, a new position of the light point 51 can be calculated. Clearly, a user, compared to the first time-interval, is pointing a bit higher in the second time-interval owing to the fact that the light points 51 and 52 and 61 and 62 are located a bit lower. Here an affine transform could be used to estimate a position of a missing light point.

Preferably, the processor 2 is arranged for improving an estimation of the at least one control feature in response to the first and second and third and fourth information from the second time-interval and/or the first and second and third and fourth information from the first time-interval. Clearly, when more information than strictly necessary is available, the information can be checked for irregularities and estimations can be improved.

When looking at the maps at different time-intervals, translations, rotations, angles, scaling, shifting etc. can be determined and assignments can be checked and/or corrected. More maps and more time-intervals and more light points are not to be excluded. A time-interval may have any kind of duration and may comprise one moment in time or more than one moment in time. Between two subsequent time-intervals, further time may be present or not.

Usually, a light point will cover more than one pixel. In case a shape of the light point or an intensity of the light point is not perfectly symmetrical, per light point a rotation can be determined by comparing both maps. In case the shape of the light point and the intensity of the light point are perfectly symmetrical, two or more light points are required to determine a rotation by comparing both maps. Light points may also be known as blobs. Blob data may include coordinate data, size data and brightness data.

A user interface system such as a pointer or gesture based control system comprises a remote control with a camera such as a camera based pointer device and a device such as a target device and a beacon such as a stationary beacon. The beacon may for example comprise infrared light emitting diodes. Blob data from up to eight blobs may be sent to the device that may process the blob data and use a process result to control the device, e.g., by adapting a graphical user interface on a display screen. To be able to reliably detect the blobs from any other noise sources, the blobs detected by the camera should be tracked across frames, such that for example their intensity modulation can be correlated in time and checked against a known modulation of the beacons. The beacons may further have a known distance between each other and/or known locations with respect to each other and/or with respect to the device. By exploiting maps with blobs across adjacent frames, positions of missing, occluded, blobs can be estimated. More robust tracking of beacons can be achieved, by exploiting blobs from one or more noise sources.

Figure 6:
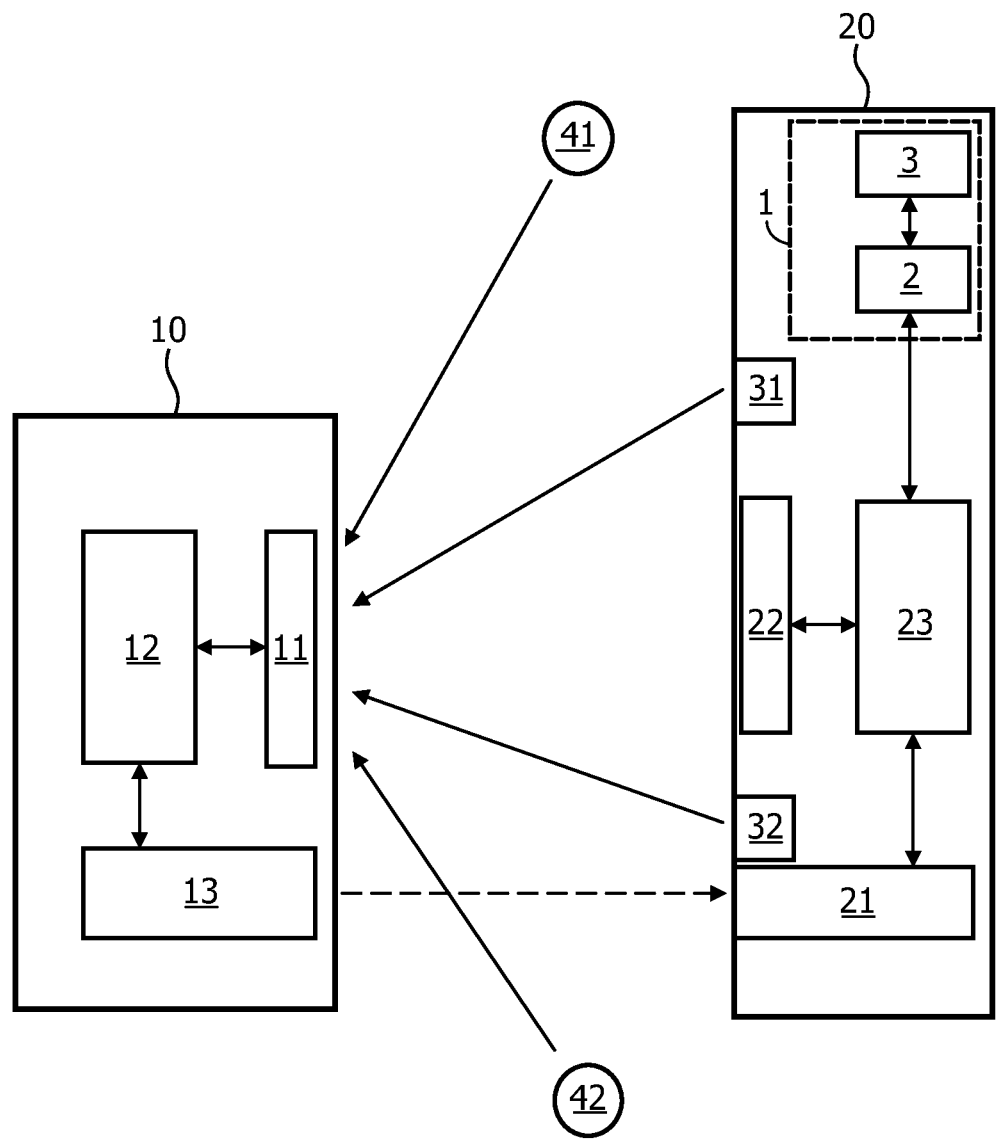
FIG. 6 shows a remote control and a device schematically, the remote control comprising a camera, and the device comprising an apparatus.

In the FIG. 6, a remote control 10 and a device 20 are shown schematically, the remote control 10 comprising a camera 11, and the device 20 comprising an apparatus 1. The FIG. 6 differs from the FIG. 2 in that the apparatus 1 has been shifted from the remote control 10 into the device 20. Further, the beacons 31 and 32 and the receiver 21 form part of the device 20, that further comprises a screen 22 coupled to a controller 23 that is coupled to the receiver 21 and to the processor 2 of the apparatus 1. In this case the transmitter 13 will send map data to the receiver 21 for controlling the device 20. Thereto, in or near the device 20, the map data is to be processed as discussed for the FIG. 2-5.

Alternatively, the apparatus 1 may form part of the controller 23, or vice versa. Alternatively, the apparatus 1 may take the place of the controller 23, or the apparatus 1 may be located between the controller 23 and the receiver 21 etc.

Alternatively, the apparatus 1 may be located outside the remote control 10 and/or outside the device 20 and being arranged to communicated via a wired or wireless coupling with the remote control 10 and/or the device 20.

Summarizing, an apparatus 1 estimates control features of remote controls 10 comprising cameras 11 for detecting light points 51, 52 from beacons 31, 32 located at or near devices 20 that are to be controlled via the remote controls 10 by letting the cameras 11 further detect light points 61, 62 from non-beacons 41, 42. Processors 2 estimate the control features in response to information from the detections of the light points 51, 52, 61, 62. The non-beacons 41, 42 comprise noise sources or any other sources different from the beacons 31, 32. Memories 3 store per time-interval the information per detection. The light coming from the beacons 31, 32 may be modulated light and the light coming from the non-beacons 41, 42 may be other light. The information may comprise coordinates, sizes and intensities of light points 51, 52, 61, 62 per detection and per time-interval. The control feature may comprise a pointing position, a distance, a rotation, a tilt, a location, a speed, an acceleration, a movement and/or a zoom of the remote control 10.

While the invention has been illustrated and described in detail in the drawings and foregoing description, such illustration and description are to be considered illustrative or exemplary and not restrictive; the invention is not limited to the disclosed embodiments. For instance, device (20) can be replaced throughout the text and claims by an object that is associated with a device (20). As example, pointing in a proximity direction of a beacon that is in proximity to a radiator knob (an object) can be used to generate a control signal for an associated central heating (a device). Another example is a window-blinds (an object) being pointed at by which a (user invisible) blinds controller (a device) can be controlled. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A system for estimating at least one control feature of a remote control, the system comprising:
the remote control comprising:
a camera for:
detecting at least one light point originating from at least one beacon located at or near a device that is to be controlled via the remote control, the at least one light point originating from the at least one beacon comprising: at least one of a first light point and a second light point originating from respective a first beacon and a second beacon; and
detecting at least one additional light point originating from at least one non-beacon comprising any other light source different from the at least one beacon, the at least one additional light point originating from the at least one non-beacon comprising: at least one of a third light point and a fourth light point originating from respective first non-beacon and second non-beacon; and
a processor in communication with a memory, the memory storing, per time-interval, first information associated with the first detected light point associated with the first beacon, second information associated with the second detected light point associated with the second beacon, third information associated with the third detected light point of the first non-beacon, and fourth information associated with the fourth detected light point associated with the second non-beacon; and
the processor estimating the at least one control feature in response to information of the at least one light point from the at least one beacon and the at least one additional light point from the at least one non-beacon.

2. The system as defined in claim 1, wherein when only the first beacon is present and only the first non-beacon is present, the processor estimates the first information for a time-interval by processing the third information from the time-interval and the first information and the third information from a previous time-interval.

3. The system as defined in claim 1, wherein when the first beacon and the second beacon are present and only the first non-beacon is present, the processor estimates the first information for a time-interval by processing the second and third information from the time-interval and the first information, the second information and the third information from a previous time-interval.

4. The system as defined in claim 1, wherein when the first beacon and the second beacon are present and the first non-beacon and the second non-beacon are present, the processor estimates the first information for a time-interval by processing the second, the third and the fourth information from the time-interval and the first information, the second information, the third information and the fourth information from a previous time-interval.

5. The system as defined in claim 1, wherein when the first beacon and the second beacon are present and the first non-beacon and the second non-beacon are present, the processor improves an estimation of the at least one control feature in response to at least one of the first information, the second information, the third information and the fourth information from a time-interval and the first information, the second information, the third information and the fourth information from a previous time-interval.

6. The system as defined in claim 1, the light coming from the at least one beacon being modulated light and the light coming from the at least one non-beacon being other light.

7. The system as defined in claim 1, the information comprising at least one of: a coordinate, a size, an intensity per detection and per time-interval.

8. The system as defined in claim 1, the at least one control feature comprising at least one of: a pointing position on the device, a distance between the remote control and the device, a rotation of the remote control, a tilt of the remote control and a location of the remote control with respect to the device.

9. The system as defined in claim 1, the at least one control feature comprising at least one of: a speed of the remote control, an acceleration of the remote control, a movement of the remote control and a zoom of the remote control (10).

10. A remote control comprising:
   a camera for:
      detecting at least one light point originating from at least one beacon located at or near a device that is to be controlled via the remote control, the at least one light point originating from the at least one beacon comprising: at least one of a first light point and a second light point originating from respective a first beacon and a second beacon; and
      detecting at least one additional light point originating from at least one non-beacon comprising any other light source different from the at least one beacon, the at least one additional light point originating from the at least one non-beacon comprising: at least one of a third light point and a fourth light point originating from respective first non-beacon and second non-beacon; and
   a processor estimating at least one control feature of the remote control in response to information from the detections of both the at least one light point from the at least one beacon and the at least one additional light point originating from the at least one non-beacon, wherein the at least one light point and the at least one additional light point are determined on a per-time basis.

11. A method for estimating at least one control feature of a remote control, the method operable in a processor, causing the processor to execute the acts of: i
   receiving at least one light point originating from at least one beacon located at or near a device, the at least one light point originating from the at least one beacon comprising: at least one of a first light point and a second light point originating from respective a first beacon and a second beacon; and
   receiving at least one additional light point originating from at least one non-beacon being any other light source different from the at least one beacon, the at least one additional light point originating from the at least one non-beacon comprising: at least one of a third light point and a fourth light point originating from respective first non-beacon and second non-beacon,
   estimating the at least one control feature of the remote control in response to information from the detections of both the at least one light point from the at least one beacon and the at least one light point originating from the at least one non-beacon.

12. A computer program product, stored on a tangible medium, that is neither a transitory signal nor a wave, comprising code which when accessed by a processor causes the processor to execute the acts of:
   receiving at least one light point originating from at least one beacon located at or near a device, the at least one light point originating from the at least one beacon comprising: at least one of a first light point and a second light point originating from respective a first beacon and a second beacon;
   receiving at least one additional light point originating from at least one non-beacon being any other light source different from the at least one beacon, the at least one additional light point originating from the at least one non-beacon comprising: at least one of a third light point and a fourth light point originating from respective first non-beacon and second non-beacon, and
   estimating the at least one control feature of a remote control in response to information from the detections of both the at least one light point from the at least one beacon and the at least one light point originating from the at least one non-beacon.

13. The apparatus as defined in claim 1, wherein the first information, the second information, the third information and the fourth information comprises at least one of: a coordinate, a size, and an intensity of the corresponding light point.

14. An apparatus for estimating at least one control feature of a remote control, the apparatus comprising:
   an input configured for:
      receiving information for at least one light point originating from at least one beacon located at or near a device that is to be controlled via the remote control, the at least one light point originating from the at least one beacon comprising: at least one of the following list: a first light point from a first beacon, and a second light point from a second beacon; and
      receiving information for at least one additional light point originating from at least one non-beacon comprising any other light source different from the at least one beacon, the at least one additional light point originating from the at least one non-beacon comprising: at least one of a third light point and a fourth light point originating from respective first non-beacon and second non-beacon;
   a memory configured for storing, per time-interval, first information associated with the first detected light point associated with the first beacon, second information associated with the second detected light point associated with the second beacon, third information associated with the third detected light point of the first non-beacon, and fourth information associated with the fourth detected light point associated with the second non-beacon;
   a processor estimating the at least one control feature of the remote control in response to the information for the at least one light point from the at least one beacon and the at least one additional light point from the at least one non-beacon; and
   an output sending the control feature estimate to the remote control.

* * * * *